Patented Aug. 19, 1952

2,607,803

UNITED STATES PATENT OFFICE 2,607,803

S-POLYALKYLENE GLYCOL DERIVATIVES OF THIURONIUM SALTS

Hans Z. Lecher, Plainfield, and Tsai Hsiang Chao, Bound Brook, N. J., assignors to American Cyanamid Company, New York, N. Y., a corporation of Maine No Drawing. Application December 8, 1948, Serial No. 64,244

7 Claims. (Cl. 260—564)

This invention relates to S-polyalkylene glycol derivatives of thiuronium salts having the formula:

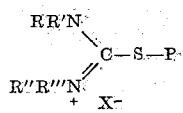

in which R, R', R", and R'" are hydrogen or aliphatic, alicyclic, aromatic-aliphatic, or aromatic hydrocarbon radicals, X is an anion and P is the radical, attached to the sulfur atom by a C—S bond, of a polyethylene or polypropylene glycol, this radical having an average molecular weight between 170 and 6000. These compounds show properties which make them highly useful in a variety of ways as surface active agents.

Many of them are of value as dyeing assistants which improve the levelness of wool dyeings and at the same time permit such dyeings to be made at reduced acid concentrations. Many compounds of the present invention are valuable components of compositions for softening resin treated fabrics. The compounds are also useful as intermediates in the preparation of other families of substances. For example, they can be conveniently hydrolyzed to the mercaptans of the formula P—SH.

The precise properties of the compounds of the present invention can be controlled by changes in the different groups. The identity of the anion X is not of primary importance. On the other hand, the magnitude of the alkyl group or groups is of great significance, since with increasing size they render the compounds less water soluble and more soluble in organic solvents. Increase in the length of the polyalkylene glycol chain, on the other hand, increases the water solubility. Thus, by a proper choice of substituents, a compound can be prepared with the right balance of properties for a particular function as desired.

The compounds of the present invention are prepared by reacting thiourea or its N-substituted products and a polyalkylene glycol derivative having an active group capable of reaction with the sulfur of the thiourea. Typical of such compounds are the halohydrins of the polyalkylene glycols, particularly the bromohydrins. These bromohydrins may be prepared from dry hydrogen bromide and the polyalkylene glycol at temperatures up to 150° C. Neither the process of preparing the bromohydrins nor the compounds themselves are claimed in this application, but constitute the subject matter of the co-pending application of Chao, Serial No. 64,242, filed December 8, 1948, now abandoned.

In addition to thiourea itself, a very great variety of N-substituted thioureas may be used as starting materials. Monoalkylthioureas, such as N-methyl, N-ethyl, N-isopropyl, N-n-dodecyl, N-n-octadecylthiourea; N,N' and N,N-dialkyl thioureas in which the alkyl group may be the same as in N,N-dimethylthiourea and N,N'-diethylthiourea, or different, as in N-n-octadecyl-N'-methylthiourea; N,N,N'-trialkyl thioureas such as N,N,N'-trimethylthiourea, N,N-dimethyl-N'-ethylthiourea, N-n-dodecyl-N',N'-dimethylthiourea; and N,N,N', N'-tetraalkylthioureas such as N,N,N',N'-tetramethylthiourea may be used since all of these compounds form S-substituted thiuronium salts.

The substituting radicals may also be aromatic, such as in N-phenylthiourea or N-2-thenylthiourea, or both aromatic and aliphatic as in N-phenyl-N'-n-dodecylthiourea.

It is an advantage of the present invention that the reaction between the polyalkylene halohydrin and the thiourea proceeds normally, no special technique being necessary. The reactants may simply be warmed together in equimolar amounts, 100° being a suitable temperature. If desired, a solvent may be employed, such as alcohol; in this case the reaction is conducted in the refluxing alcohol. The course of the reaction is traceable by titration for anionic bromine.

With the completion of the reaction, the thiuronium halide is present in high yield and substantially pure form. Depending on the molecular weight, some of these salts are liquid and some are solid. They are stable substances in acid and neutral solution but decompose under the influence of alkali. The halides may be easily converted into other salts by double decomposition with other acids or with their lead, silver or thallous salts, etc. Sulfates, nitrites, phosphates, trichloroacetates, benzenesulfonates, picrates, and salts of many other inorganic and organic acids are obtainable. However, since the valuable and specific properties reside essentially in the thiuronium cation, the variation of the anion is not of great practical importance.

The invention is further illustrated by the following examples. Parts are by weight.

Example 1

A mixture, composed of 8.5 parts of thiourea and 76.7 parts of polyethylene glycol bromohydrin of average molecular weight 660, is heated to solution and then maintained at steam bath temperature for 25 minutes. There is obtained a nearly quantitative yield of the thiuronium bromide, which is a liquid soluble in water but insoluble in acetone.

Example 2

A mixture, composed of 5.7 g. of thiourea and 81.5 g. of polyethylene glycol bromohydrin of average molecular weight 1050, is heated to solution and then heated at 100° for 20 minutes. The thiuronium bromide is a water-soluble and acetone-soluble solid.

Example 3

Equimolecular quantities of $\alpha,\omega$-bromohydrin derived from the polyethylene glycol of average molecular weight 4000 and thiourea are heated together at 100° C. for 2.5 hours. Analysis of bromide ions shows 80% reaction. The product is a solid with a M. P. about 43–47° C.; soluble in $H_2O$, alcohol and acetone.

Example 4

Equimolecular quantities of a bromohydrin of the polypropylene glycol having an average molecular weight 400 and thiourea are mixed with 0.8 part of alcohol and the mixture heated, under reflux condenser, for two hours. Analysis of bromide ions indicates a 94% reaction. Removal of the alcohol yields a viscous liquid which is soluble in water, acetone and alcohol, the aqueous solution being somewhat turbid.

Example 5

By the technique described in Examples 1, 2, 3, and 4, thiourea is brought into reaction with polyethylene and polypropylene glycol bromohydrins of average molecular weights from 190 to 6100. The thiuronium bromides show a general resemblance in physical properties, the lower members, through the molecular weight range of 800, being liquids, and the higher members solids.

Example 6

Equal molecular quantities of $\alpha,\omega$-bromohydrin of the polyethylene glycol having an average molecular weight of 200 and N,N'-di(n)-butyl thiourea are heated together at about 100° C. for two hours, with contant stirring. Analysis of the product for bromide ions indicates practically complete reaction. A viscous oil, the product forms a somewhat turbid solution in water.

Example 7

A mixture of 33.3 parts of n-dodecylamine, 67.3 parts of water, and 7.2 parts of sodium hydroxide, is treated with 13.9 parts of carbon disulfide, the temperature being kept below 40° C. When the addition is complete, the mixture is heated at 100° C. for two hours and cooled. There is added gradually 20.5 parts of ethyl chloroformate, stirring being maintained during addition and for one-half hour afterwards. The mixture is then heated to 80° until gas evolution ceases. The waxy solid which forms is separated and washed with methanol, there being obtained the oily dodecyl isothiocyanate.

A mixture of 12.5 parts of the isothiocyanate thus obtained and 40.4 parts of 28% ammonium hydroxide is heated at 100° for two hours. There is obtained N-(n-dodecyl)-thiourea, M. P. 104–6°.

Example 8

Equimolecular quantities of $\alpha,\omega$-bromohydrin derived from polyethylene glycol having an average molecular weight of 200 and n-dodecyl thiourea are heated together at 100° C. with stirring for 2.5 hours. Analysis of bromide ions indicates a 95% reaction. The product is a viscous oil soluble in water, alcohol, and acetone.

In coupling tetrazotized 3.3'-dichlorobenzidine with a slurry of acetoacet-2-methoxy-5-methylanilide, it is found that the presence of approximately 2% of this product (based on the weight of pigment formed) causes a marked acceleration of coupling and of crystal formation, with resulting improvement of brightness and purity of tone of the yellow pigment.

Example 9

Equimolecular quantities of $\alpha,\omega$-bromohydrin derived from the polyethylene glycol having an average molecular weight of 300 and n-dodecyl thiourea are mixed and heated together at about 100° C. for 2.5 hours with stirring. Analysis of bromide ions indicates a 90% reaction. The product is a viscous oil soluble in water, alcohol, and acetone.

Wool dyeings were made with 5% sulfuric acid and 1.0% of the wool bordeaux which is the chromium complex of the azo dye prepared from diazotized 1-amino-2-naphthol-4-sulfonic acid and o-ethoxybenzoylacetonitrile, as described in U. S. 2,366,633. The addition of 2% of the above thiuronium salt caused striking improvement in the evenness and efficiency of dyeing.

Example 10

Equimolecular quantities of $\alpha,\omega$-bromohydrin derived from a polyethlene glycol mixture having average molecular weight 4000 and dodecyl thiourea are heated together, at 100° for 2½ hours. Analysis of bromide ions indicates practically complete reaction. The product is a solid at room temperature, soluble in water, alcohol, and acetone. It melts at approximately 40–45° C.

Example 11

A solution of 18.5 parts of n-dodecylamine and 3.8 parts of carbon disulfide in 40 parts of ethanol is refluxed five hours. The resulting N,N'-di(dodecyl) thiourea crystallizes from the reaction mixture. It melts 76–78° and may be crystallized from alcohol.

Example 12

A solution in 16 parts of alcohol, of 4.1 parts of di-dodecylthiourea and 2.6 parts of polyethylene glycol bromohydrin of molecular weight 260, is refluxed for 16 hours and then evaporated. The resulting thiuronium bromide is obtained as an oil, easily emulsified in water.

Example 13

Equimolecular quantities of $\alpha,\omega$-bromohydrin derived from the polyethylene glycol having average molecular weight 600 and n-octadecylthiourea are dissolved in 1.3 parts of alcohol, and the solution heated with steam for two hours under reflux. Analysis of bromide ions indicates practically complete reaction. The alcohol is removed by evaporation and the product obtained as a light paste. It is soluble in water, alcohol and acetone.

Example 14

Equimolecular quantities of $\alpha,\omega$-bromohydrin derived from the polyethylene glycol having average molecular weight 4000 and n-octadecyl thiourea are mixed with 0.6 part of alcohol and the mixture heated externally with steam and stirred for two hours. Analysis of bromide ions indicates complete reaction. After the alcohol is evaporated, the product is found to be a solid, soluble in water and acetone. M. P. 45–50° C.

*Example 15*

A mixture of equimolecular quantities of α,ω-bromohydrin derived from the polyethylene glycol having an average molecular weight of 200 and N,N'-dodecyl phenyl thiourea is heated externally with steam and under continuous stirring for 1.5 hours. Analysis of bromide ions indicates a 90% reaction. The product is a viscous liquid, very soluble in alcohol and acetone.

The dodecyl phenyl thiourea is made by mixing equimolecular quantities of phenyl isothiocyanate and dodecylamine and heating the mixture to about 100° C. under continuous stirring for 0.5 hour. The product crystallizes from alcohol, M. P. 73–76°.

We claim:

1. A member of the group consisting of compounds of the formula

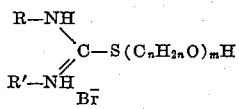

wherein R is a substituent selected from the group consisting of hydrogen and alkyl radicals and R' is a substituent selected from the group consisting of hydrogen, phenyl and alkyl radicals, $n$ is an integer greater than one but less than four, and $m$ is an integer of such magnitude that the molecular weight of the radical $(C_nH_{2n}O)_mH$ is between 170 and 6000.

2. A compound having the formula

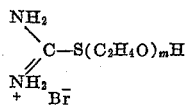

wherein $m$ is an integer of such magnitude that the molecular weight of the radical $(C_2H_4O)_mH$ is between 170 and 6000.

3. A compound having the formula

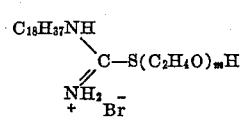

wherein $m$ is an integer of such magnitude that the molecular weight of the radical $(C_2H_4O)_mH$ is between 170 and 6000.

4. A compound having the formula

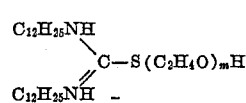

wherein $m$ is an integer of such magnitude that the molecular weight of the radical $(C_2H_4O)_mH$ is between 170 and 6000.

5. A compound having the formula

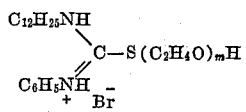

wherein $m$ is an integer of such magnitude that the molecular weight of the radical $(C_2H_4O)_mH$ is between 170 and 6000.

6. A compound having the formula

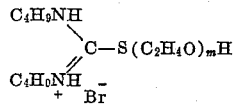

wherein $m$ is an integer of such magnitude that the molecular weight of the radical $(C_2H_4O)_mH$ is between 170 and 6000.

7. A process for preparing a compound having the formula

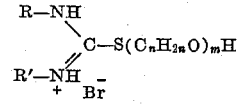

wherein R is a substituent selected from the group consisting of hydrogen and alkyl radicals and R' is a substituent selected from the group consisting of hydrogen, phenyl and alkyl radicals; $n$ is an integer greater than one but less than four, and $m$ is an integer of such magnitude that the molecular weight of the radical $(C_nH_{2n}O)_mH$ is between 170 and 6000; by heating substantially equal molecular amounts of a thiourea having the formula

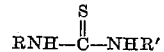

in which R and R' are as defined above and a bromohydrin of the formula

HO($C_nH_{2n}O$)Br in which $n$ and $m$ are as defined above; the reaction being effected at a temperature between 40° C. and 150° C. in the presence of alcohol until substantially all the bromine is present in ionic form.

HANS Z. LECHER.
TSAI HSIANG CHAO.

REFERENCES CITED

The following references are of record in the file of this patent:

UNITED STATES PATENTS

| Number | Name | Date |
|---|---|---|
| 1,963,762 | Pungs et al. | June 19, 1934 |
| 2,238,949 | Schlack | Apr. 22, 1941 |
| 2,302,762 | Graenacher et al. | Nov. 24, 1942 |
| 2,347,827 | Hunt | May 2, 1944 |

OTHER REFERENCES

Olin et al.: "J. Am. Chem. Soc.," vol. 52 (1930), pp. 3322–3327.